(12) United States Patent
Froncioni et al.

(10) Patent No.: US 8,612,165 B2
(45) Date of Patent: Dec. 17, 2013

(54) DETERMINING ANGULAR DEPENDENCE OF AERODYNAMIC DRAG AREA FOR A VEHICLE

(75) Inventors: Andy Froncioni, Westmount (CA); Robert Chung, Berkeley, CA (US)

(73) Assignee: Alphamantis Technologies Inc., Westmount (CA)

( * ) Notice: Subject to any disclaimer, the term of this patent is extended or adjusted under 35 U.S.C. 154(b) by 469 days.

(21) Appl. No.: 13/042,169

(22) Filed: Mar. 7, 2011

(65) Prior Publication Data

US 2012/0221257 A1    Aug. 30, 2012

Related U.S. Application Data

(60) Provisional application No. 61/447,612, filed on Feb. 28, 2011, provisional application No. 61/448,530, filed on Mar. 2, 2011.

(51) Int. Cl.
*G06F 7/00* (2006.01)

(52) U.S. Cl.
CPC ........................................ *G06F 7/00* (2013.01)
USPC ........................................................... 702/45

(58) Field of Classification Search
USPC ............................................ 702/45, 182–185
See application file for complete search history.

(56) References Cited

U.S. PATENT DOCUMENTS

| | | | | |
|---|---|---|---|---|
| 4,532,801 A | * | 8/1985 | Coder et al. | 73/866.4 |
| 7,040,158 B1 | * | 5/2006 | Keith et al. | 73/170.33 |
| 7,254,998 B2 | * | 8/2007 | Rueger | 73/147 |
| 7,377,180 B2 | | 5/2008 | Cunningham | 73/781 |
| 7,387,029 B2 | | 6/2008 | Cunningham | 73/781 |

OTHER PUBLICATIONS

R. Chung "Indirect Estimation of CdA using a power meter" Jul. 14, 2007, Internet presentation (link to a modified version dated Aug. 2010) http://anonymous.coward.free.fr/wattage/cda/indirect-cda.pdf.

Martin, et al. (2006), "Aerodynamic drag area of cyclists determined with field-based measures", Sportscience 10: 68-9.

Snyder, J.; and T. Schmidt (2004), "Determination of drag parameters utilizing a bicycle power meter", HPeJ issue 1 http://www.hupi.org/HPeJ/0005/0005.htm.

H.W. Schreuder, "Measurement of Bicycle Drag Coefficients by Simple Means", Version 1.1 (Dec. 23-26, 2002), http://www.xs4all.nl/~cp4trml/metingen/measurements.html.

\* cited by examiner

*Primary Examiner* — Edward Raymond
(74) *Attorney, Agent, or Firm* — Matthew A. Pequignot; Pequignot + Myers LLC (57) ABSTRACT

The invention relates to a method and system for determining an aerodynamic drag area CxA of a moving vehicle, for example a bicycle, in dependence upon the airflow yaw direction and speed without the use of a wind tunnel. The vehicle is equipped with sensors for collecting time-stamped values indicative of the vehicle speed, propulsion force, airflow speed and yaw angle of the airflow at various points during the trip. The trip data are then processed using successively refined hypotheses regarding the CxA(yaw) dependence to generate a plurality of elevation profiles for the travelled path. The generated elevation profiles are then evaluated based on available route elevation information to select a correct dependence of the aerodynamic drag area upon the yaw angle of the airflow.

20 Claims, 9 Drawing Sheets

DETERMINING ANGULAR DEPENDENCE OF AERODYNAMIC DRAG AREA FOR A VEHICLE

CROSS-REFERENCE TO RELATED APPLICATIONS

The present invention claims priority from U.S. Provisional Patent Application No. 61/447,612 filed Feb. 28, 2011, which is incorporated herein by reference for all purposes, and from U.S. Provisional Patent Application No. 61/448,530 filed Mar. 2, 2011, which is incorporated herein by reference for all purposes.

TECHNICAL FIELD

The present invention generally relates to methods and systems for measuring aerodynamic properties of objects, and more particularly relates to methods and devices and systems for determining the dependence of a drag area of an object upon airflow yaw angle direction.

BACKGROUND OF THE INVENTION

Modern vehicles are often provided with performance monitoring devices that use different types of sensors to record various characteristics related to the vehicle's motion and the environment. Known sensors include speed sensors, acceleration sensors, power sensors, temperature sensors, and air flow sensors. Although originally such sensors were mostly used in complex self-propelled vehicles such as airplanes and cars, their use has lately expanded to human-powered devices such as bicycles. Modern high-performance bicycles are often equipped with performance monitoring devices that enable measuring pedal torque, power output and energy expended by direct or indirect measurements of the forces that the rider is applying to drive a vehicle forward. Examples include mechanical strain gauges installed in crank mechanisms or wheel hubs to measure the applied forces and speeds, and thus derived indications corresponding to power and energy.

U.S. Pat. Nos. 7,377,180 and 7,387,029 assigned to Velocomp, LLP, which are incorporated herein by reference and referred to hereafter as '180 and '029 respectively, disclose an apparatus for measuring total force in opposition to a moving vehicle, such as a bicycle, and method of using thereof, which includes a front-facing sensor for measuring static and dynamic pressure, sensors of speed and acceleration of the bicycle, and a microprocessor that receives data from the sensors and calculates power expended by the rider or other power source by finding the total of all forces impinging upon the vehicle and ride. The apparatus further requires an acceleration sensor to measure the acceleration in the direction of travel.

The differential pressure sensor disclosed in '180 and '029 is a front-facing Pitot tube, which provides information on the aerodynamic pressure Q against the front of the vehicle; this information is then used to calculate the opposing aerodynamic force $F_{air}$ based on an assumption that this force is equal to Q times an aerodynamic factor that defined in '180 as the product of a drug coefficient times frontal area of the vehicle. This product is also referred to in the art as the 'drag area', 'CdA' or 'CxA', and is an important parameter defining the strength of the aerodynamic drag for a vehicle.

In the method described in the '180 and '029 patents, the aerodynamic factor is estimated using a "coast-down calibration" procedure, which involves the vehicle gaining a certain (high) speed, then stopping all pedaling or power input and letting the vehicle coast down to a predetermined (low) speed while the rider maintains his usual riding position. During the coast-down period the system records sensors readings, which are then used by a curve fitting technique to determine static (rolling friction) and dynamic (wind) forces, including an averaged value of the aerodynamic factor (drag area) of the vehicle.

An alternative method of determining a rolling resistance coefficient $C_{rr}$ and the drag area, or CdA, for a vehicle has been disclosed by H. W. Schreuder (Dec 2002) and Robert Chung (April 2003) and is referred to as the virtual elevation (VE) method. This method does not require an acceleration sensor, and includes having the vehicle equipped with a speed sensor and, optionally, a power sensor travel along a route having known elevation features, and then post-processing collected trip data to compute various 'virtual elevation' (VE) profiles for the route using different trial values for the $C_{rr}$ and CdA parameters. The correct the $C_{rr}$ and CdA values results in a VE profile that matches known elevation features of the route.

One disadvantage of the conventional VE method and the method of '180 is that these prior art methods can only determine an average value of the effective drag area, or the CdA parameter, during the trip. In reality, the effective drag area may depend on the direction of the airflow with respect to the direction of the vehicle's motion, and thus changes in dependence on the strength and direction of wind and/or vehicle motion direction with respect to the wind. The dependence of the aerodynamic drag area on the airflow angle, which is an important aerodynamic characteristic of the vehicle, is not attainable by the aforedescribed prior art methods. Conventionally, this dependence is determined in a wind tunnel, which is expensive and may not be easily available, especially for a typical, or even a professional, bicycle rider.

An object of the present invention is to provide a method, system and apparatus that may be used in a vehicle to determine the dependence of the aerodynamic drag area thereof on the airflow direction.

SUMMARY OF THE INVENTION

The invention relates to a method and system for determining an aerodynamic drag area CxA of a moving vehicle, for example a bicycle, in dependence upon the airflow direction and speed without the use a wind tunnel. The vehicle is equipped with sensors for collecting time-stamped values indicative of the vehicle speed, propulsion force, airflow speed and yaw angle of the airflow at various points during the trip. The trip data are then processed using successively refined hypotheses regarding the CxA(yaw) dependence to generate a plurality of elevation profiles for the travelled path. The generated elevation profiles are then evaluated based on available route elevation information to select a correct dependence of the aerodynamic drag area upon the yaw angle of the airflow.

One aspect of the present invention provides a method for determining an aerodynamic drag area for a vehicle in dependence upon an airflow direction. The method comprises: a) obtaining vehicle trip data comprising airflow data and collected for the vehicle during a trip thereof along a selected route, wherein the airflow data comprises airflow yaw angle data and airflow speed data, or information indicative thereof; b) from the vehicle trip data, computing a plurality of virtual elevation or slope profiles for the trip using a plurality of rules relating the aerodynamic drag area to the airflow yaw angle; c) selecting, from the plurality of rules relating the aerodynamic drag area to the airflow yaw angle, a selected rule that corresponds to a virtual elevation or slope profile that matches a known feature of the trip; and, d) using the selected rule for computing the aerodynamic drag area of the vehicle in dependence upon the airflow yaw angle.

According to one aspect of the invention, the plurality of rules relating the aerodynamic drag area to the airflow yaw angle may be defined by a set of at least two adjustable parameters, and steps b) and c) may include: e) assigning values to the adjustable parameters, f) using the adjustable parameters and the airflow yaw angles comprised in the airflow data to generate a plurality of aerodynamic drag area values for the trip, g) computing a virtual elevation or slope profile for the trip using the plurality of aerodynamic drag area values generated in step f), h) computing an elevation error based on the computed virtual elevation or slope profile and a known feature of the trip, and i) repeating steps f) to h) while adjusting values of the adjustable parameters so as to reduce the elevation error.

An aspect of the invention provides A computer program product for determining an aerodynamic drag area (ADA) of a moving vehicle in dependence on airflow yaw direction, the computer program product comprising a computer-readable storage medium containing a first set of computer executable instructions, which, when executed by a processor, cause the processor to perform the steps of: a) obtaining vehicle trip data comprising drive power data, vehicle speed data, and airflow data, the vehicle trip data collected at the vehicle during a trip thereof along a selected route, wherein the airflow data comprises time-stamped sequences of airflow speed values and airflow yaw values relative to the moving vehicle; b) using the vehicle trip data and a plurality of rules relating the ADA to the airflow yaw angle to compute a plurality of virtual elevation or slope profiles for the trip; c) selecting, from the plurality of rules relating the ADA to the airflow yaw angle, a selected rule that corresponds to a virtual elevation or slope profile that matches a known trip feature; and, d) saving the selected rule in computer-readable memory.

An aspect of the present invention provides an apparatus for determining an aerodynamic drag area (ADA) for a vehicle. The apparatus comprises: an input port for receiving vehicle trip data comprising drive power data, vehicle speed data, and airflow data, the vehicle trip data collected for the vehicle during a trip thereof along a selected route, wherein the airflow data comprises airflow yaw angle data and airflow speed data, or information indicative thereof; a data storage for storing the vehicle trip data comprising airflow speed data and the airflow yaw angle data; a program storage containing computer executable instructions for generating a plurality of rules relating the ADA to the airflow yaw angle, using set plurality of rules to generate a plurality of virtual elevation or slope profiles for the trip, evaluating said plurality of virtual elevation or slope profiles based on known route or trip information to select one of the rules, and to store the selected route in memory for use in computing the ADA for the vehicle in dependence upon the airflow yaw angle; and, a processor coupled to the data storage and the program storage for executing the computer code.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

Exemplary embodiments of the present invention will now be described with reference to a bicycle. However, it will be appreciated that various aspects of the present invention are applicable to any ground or water vehicle, whether powered by a human or another power source. The term "vehicle" as used in this specification may include a human that is using the vehicle. For example, the drag coefficient and drag area of a bicycle "vehicle" would include the effect of a rider. The term elevation as used herein may mean the height of a particular location on the ground relative to a fixed reference point, and can also mean altitude. The term 'elevation profile' is used herein with reference to a route or path to mean a dependence of the elevation on a position along the route or path; when used with reference to a trip along a route or path, the term 'elevation profile' may also mean a dependence of the elevation on time or distance travelled along the route or path during the trip. The term 'time stamped' as used herein with reference to a value means a value that is associated with a particular time instance and is provided with reference thereto. Unless stated otherwise, the terms 'coupled' and 'connected' are used herein interchangeably and may mean either a direct connection or indirect connection by means of intermediary devices, systems or subsystems.

The present invention is directed to determining the dependence of an aerodynamic drag coefficient (ADA) of a moving vehicle in dependence upon the airflow yaw angle direction relative to the vehicle without the use of a wind tunnel, and includes processing of vehicle trip data collected during a trip along a selected path. The method includes evaluating a plurality of different mapping rules relating the ADA to the airflow yaw angle direction, based on a reconstruction of a virtual profile of the travelled path using the mapping rules, and selecting the rule best matching known trip information.

Figure 1:
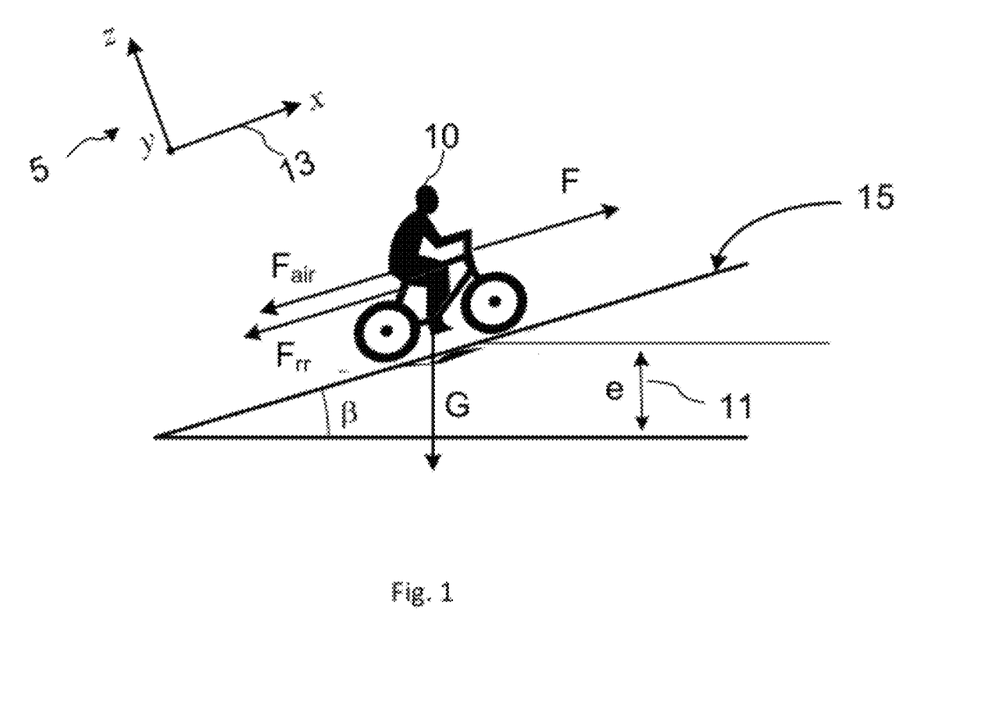
FIG. 1 is a schematic representation of a moving vehicle illustrating forces affecting its axillar motion.

Prior to describing exemplary embodiments of the present invention, it is instructive to consider the balance of forces exerted upon a moving vehicle in the direction of the vehicle's motion. With reference to FIG. 1, there is schematically illustrated a vehicle 10, exemplified by a bicycle, moving upwards along a sloped surface or incline 15 having an incline, or slope, angle β relative to horizontal. For convenience we introduce a Cartesian coordinate system 5, in which the x-axis 13 is directed along the longitudinal axis of the vehicle 10 in the direction of the vehicle's motion, the z-axis is directed upwards from the vehicle, and the y-axis directed along the ground normally to the vehicle's longitudinal axis and the plane of the figure, away from the viewer. The x-axis will also be referred to as the vehicle's axis.

Newton's Second Law for the dynamics of axial motion of the vehicle can be expressed in the form of the following equation (1), where a denotes the vehicle's acceleration, a=dv/dt, where v the speed of the vehicle:

$$F - F_{rr} - F_{air} - G \cdot \sin(\beta) = m \cdot a, \quad (1)$$

In equation (1), F denotes the propulsion force exerted by the rider, also referred to herein as the drive force, $F_{rr}$ denotes the tire rolling resistance, $F_{air}$ denotes the aerodynamic drag force, i.e. the component of the aerodynamic force exerted upon the vehicle by the airflow along its longitudinal axis x; $F_{air}$ is also referred to herein as the axial drag force or simply as the drag. G=m·g is the gravity, m is the total mass of the vehicle, in the considered example of the bicycle and the rider, and g is the gravitational acceleration, with a conventional standard value of 9.80665 m/s².

The rolling resistance $F_{rr}$ is conventionally described by the following equation (2):

$$F_{rr} = C_{rr} \cdot m \cdot g \cdot \cos(\beta), \quad (2)$$

where $C_{rr}$ is the rolling resistance coefficient that depends on the tire construction and materials, tire pressure, pavement consistency, etc.

The propulsion force F is equal to a propulsion power P exerted by the raider or an engine divided by the vehicle's speed v:

$$F = P/v, \quad (3)$$

The propulsion force F and the propulsion power P are also referred to herein as the drive force and the drive power, respectively. The axial drag $F_{air}$ is approximately proportional to a second power of the airflow speed u relative to the vehicle, and is conventionally described by the following equation (4):

$$F_{air} = 0.5 \cdot \rho \cdot C_x \cdot A \cdot u^2, \quad (4)$$

where ρ is the air density, $C_x$ is an aerodynamic drag coefficient for the axial drag force, A is a characteristic frontal area of the vehicle. The airflow speed u is a magnitude of the airflow velocity vector $\vec{u}$ relative to the vehicle, which is equal to the vehicle velocity minus wind velocity.

The product $C_x \cdot A$, which is also denoted herein as 'CxA' and referred to as the aerodynamic drag area (ADA) or simply as the drag area (DA), is an important parameter characterizing aerodynamic properties of the vehicle. Note that the aerodynamic drag coefficient $C_x$ for the axial drug force should be distinguished from a similar coefficient $C_d$, which is sometimes used in the literature and which relates to an aerodynamic drag force exerted upon a vehicle in the direction of airflow. Accordingly, the parameter CxA used in this specification may differ from the parameter CdA that is sometimes used in the literature.

From equations (1) to (4), the following equations (5a), (5b) that describe the motion of the vehicle 10 over time may be easily obtained:

$$dx/dt = v, \quad (5a)$$

$$dv/dt = P/(v \cdot m) - C_{rr} \cdot g \cdot \cos(\beta) - 0.5 \cdot \rho \cdot CxA \cdot u^2/m - g \cdot \sin(\beta), \quad (5b)$$

where x denotes a coordinate of the vehicle along its path in the direction of the travel, or the distance travelled by the vehicle. Parameters Crr and CxA are collectively referred to herein as resistance coefficients.

Equations (5a,b) can be used to describe the motion of the vehicle along any given path, provided that the slope angle β along the route and the resistance coefficients Crr and CxA are known. Conversely, one can record the vehicle speed v and the drive power P or drive force F during a trip and use the equation (5b) to compute the slope angle β along the route. For small slope angles β, i.e. when β is less than about 10 degrees, an equation for computing the slope angle β takes an especially simple form:

$$\beta = P/(v \cdot m \cdot g) - C_{rr} - 0.5 \cdot \rho \cdot CxA \cdot u^2/(m \cdot g) - (1/g) \cdot dv/dt, \quad (6)$$

where β is in radians. The distance x travelled by the vehicle over time t may be computed by integrating the vehicle's speed v over time, $$x = \int_o^t (t) dt.$$

Once the slope angle β0 along the route is computed, one can use it to compute an elevation at any travelled distance s within the route according to equation (7):

$$e_v = e_0 + \int_{x_0}^{x} \sin(\beta) dx \quad (7)$$

where $x_0$ is a reference point in the route, for example the start point, at which the elevation has a known reference value $e_0$, for example zero. The elevation parameter $e_v$ derived from the slope β computed using a motion equation such as equations (5b), (6) or the like is referred to herein as the virtual elevation, to distinguish it from the 'true' elevation of the route. Similarly, the slope angle β computed using equations (5a), (6) or the like based on the trip data P(t) and v(t) is referred to hereinafter as the virtual slope angle, or simply as the virtual slope, and denoted $\beta_v$.

The prior-art VE method uses a series of successively refined guesses of the values of resistance coefficients Crr and CdA to determine which values thereof yield a virtual elevation profile that matches 'true' elevation of the route obtained elsewhere. This task is relatively simple when the trip data are collected in the absence of wind, i.e. when the wind speed w is small compared to the vehicle's speed v most of the time, so that in equation 5(b) one can approximately set u=v. In the presence of substantial wind, the conventional VE method can be modified by collecting airflow-related data while the vehicle is in motion. For example, '180 patent discloses the use of a differential pressure sensor, such as a Pitot tube, for determining a dynamic air pressure Q against the front of the vehicle by measuring the difference between two pressure input ports. The frontal dynamic air pressure Q is proportional to the second power of the airflow velocity and thus can be used as a measure thereof. However, the dynamic pressure sensor disclosed in '180 does not provide information regarding the direction of the airflow, and the device disclosed in '180 is incapable of measuring the dependence of ADA on the airflow parameters.

Figure 2A:
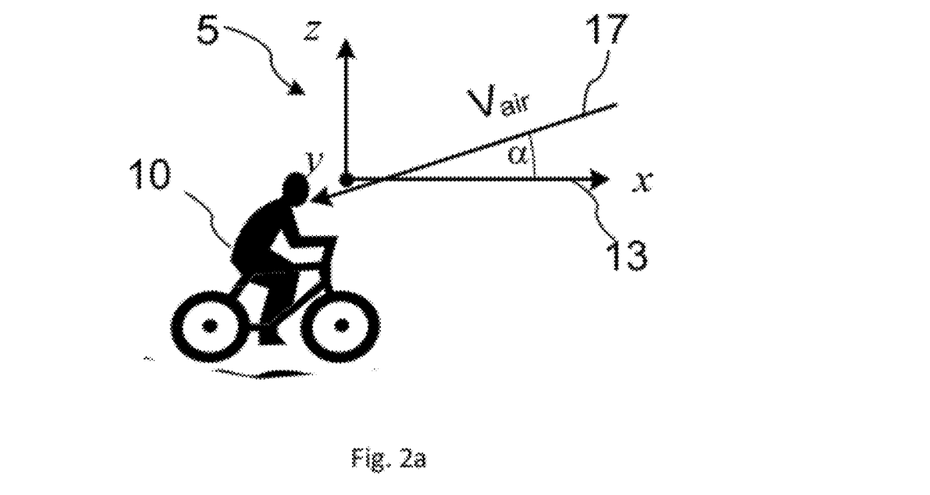
FIGS. 2a and 2b are schematic side and plan views of the moving vehicle illustrating the airflow direction relative thereto.
Figure 2B:
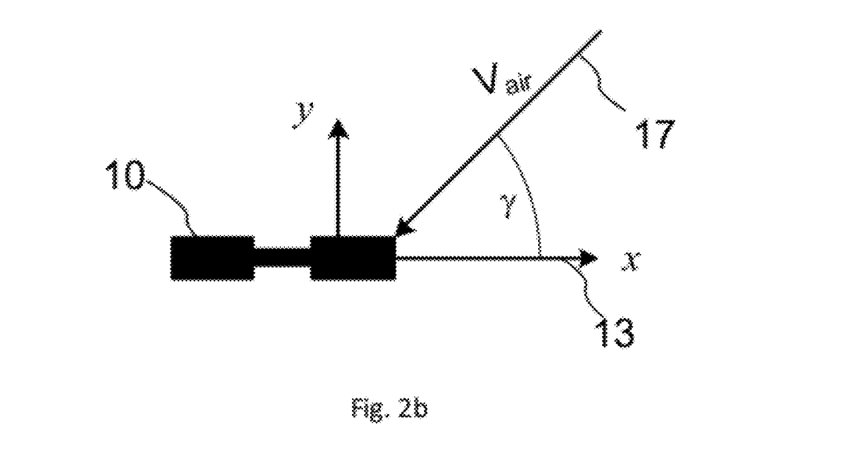

One aspect of the present invention relates to a method of determining the dependence of the 'axial' drag area CxA on the airflow direction and, optionally, the airflow velocity. This dependence can be generally described using a functional notation CxA($\vec{u}$), where $\vec{u}$ denotes the airflow velocity vector. In this specification we refer to the magnitude u of this vector as the airflow speed. FIGS. 2a and 2b illustrate by way of example a possible airflow direction relative to the vehicle 10, as represented by the air velocity vector $\vec{u}$ 17. The air velocity vector 17 is defined relative to the vehicle 10, i.e. in the vehicle coordinate system 5, and is equal to the vehicle's velocity minus the wind velocity $\vec{w}$, i.e. $\vec{u} = -\vec{w}$. The direction of the airflow relative to the vehicle 10 can be conveniently described by a yaw angle γ, which defines the airflow direction in the ground plane (x, y), and a pitch angle α, which defines the airflow direction in a 'vertical' plane (x, z), as illustrated in FIGS. 2a and 2b. In the context of this specification, the yaw angle γ of the airflow in the vehicle's coordinate system 5 is also referred to simply as yaw, and the direction of the airflow in the (x, y) plane projection as the yaw direction.

In one embodiment, the method determines the dependence of CxA upon the airflow yaw angle γ. In one embodiment, the method further determines the dependence of the CxA upon the air speed u, which accounts for possible deviations of the airflow drag force from Bernoulli's parabolic dependence thereof upon the flow speed (Equation (2)).

The method may optionally include the step of collecting air speed data and airflow yaw angle direction data for the moving vehicle during a trip of the vehicle along a selected route. In one embodiment of the invention, a sensor device is used for collecting the airflow speed and direction information. This airflow sensor may include a wireless transmitter for transmitting the airflow velocity data and the airflow yaw angle data, such as an ANT+™ transmitter. In one embodiment, the invention may include a remote processor coupled to a wireless receiver for processing these data to determine the CxA as a function of yaw angle.

Figure 3:
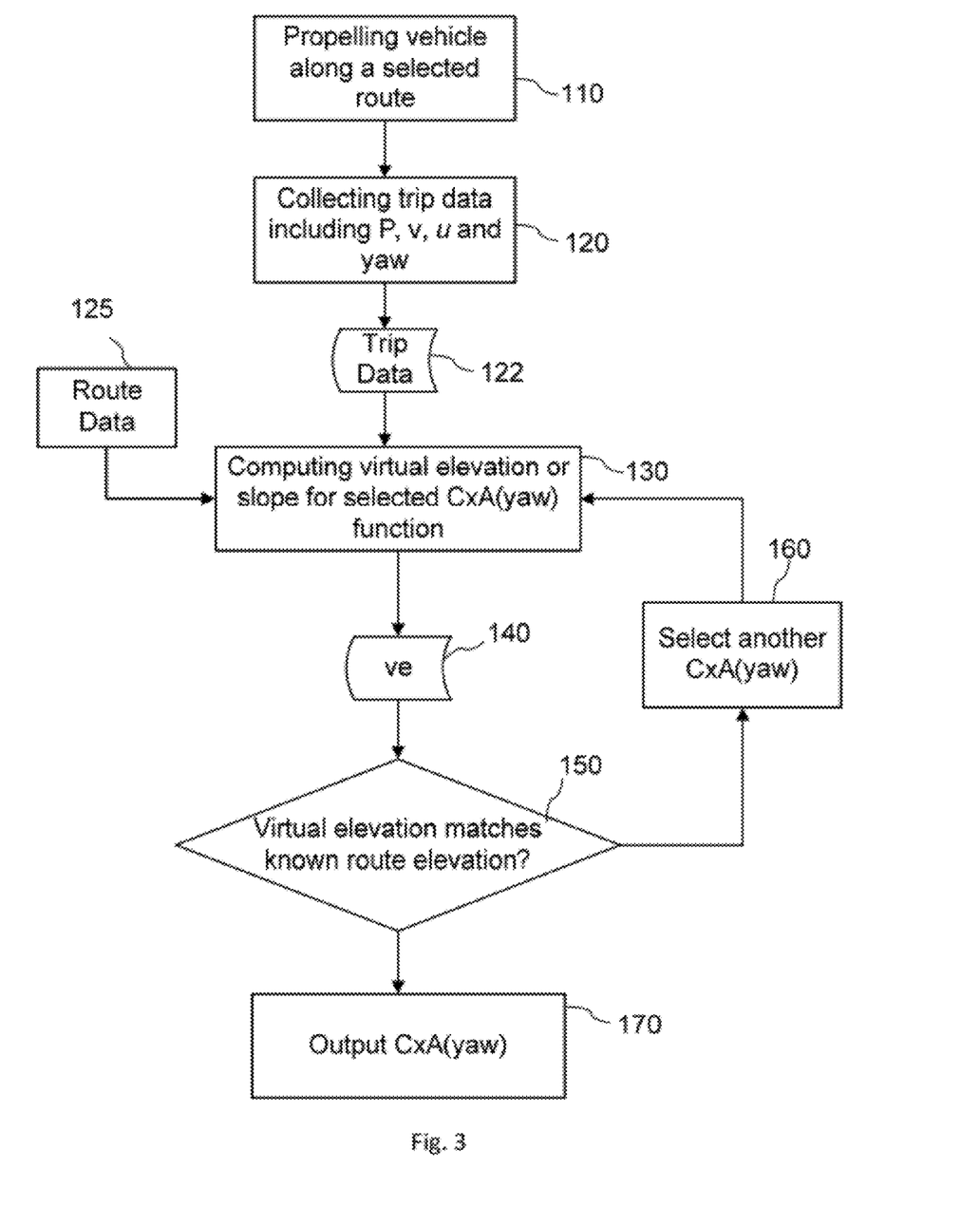
FIG. 3 is a flowchart of a method for determining the angular dependence of the aerodynamic drag area CxA according to an embodiment of the method.

With reference to FIG. 3, there is shown a flowchart of the method in an exemplary embodiment wherein the dependence of CxA on yaw for the vehicle 10 is being determined. In the illustrated embodiment, the method includes the following steps.

Figure 4A:
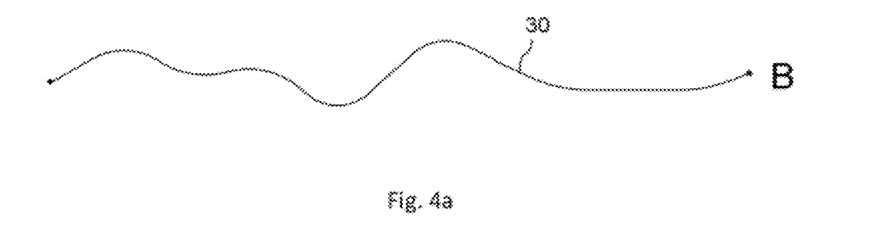
FIGS. 4a and 4b are schematic representations of a route travelled by the vehicle to collect trip data.
Figure 4B:
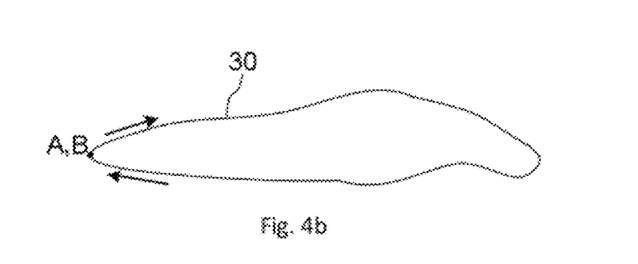

At step 110, the vehicle is propelled to move along a selected route 30, which is schematically illustrated in FIGS. 4a and 4b. The selected route 30 may be a single pathway connecting a start location 'A' to a distant location 'B' as illustrated in FIG. 4b. The selected route 30 may also be a loop wherein the start 'A' and finish 'B' may substantially coincide, as illustrated in FIG. 4b.

At step 120, vehicle trip data 122 for the moving vehicle are collected at suitably short time intervals while the vehicle moves along the route 30. The term 'trip' is used herein to refer to the vehicle's journey along the route 30 while collecting the vehicle trip data 22, from the start of the trip data collection to the end of the trip data collection. The vehicle 10 may follow different trip protocols while collecting the trip data. In one embodiment, the trip may follow a 'one-way' trip protocol, which includes a travel between the two distant locations 'A' and 'B' as illustrated in FIG. 4a, ending at the location B. In another embodiment, the vehicle may follow an 'out-and-back' trip protocol, turning around at point B and returning back along the same path finishing at 'A', in which case 'B' is a turn-around point. In one embodiment, the vehicle may then turn around at point 'A', and travel the route 30 'our-and-back' once again, and may generally travel the route 30 N≥1 times, all the while collecting the trip data. In one embodiment wherein the route 30 is a loop as illustrated in FIG. 4b, the trip may follow a 'loop' protocol, which may include making N loops along the route 30 all the while collecting the trip data. Preferably, the route 30 has varying elevation, and the rider or driver does not use brakes during the trip except when turning around. In one embodiment, the vehicle may follow a 'coasting' trip protocol, wherein no propulsion force is applied during the trip. It may include a trip wherein the trip data are collected after the vehicle accelerates to a suitably high speed and then continues to move by inertia, or wherein the vehicle is moving down the hill most of the route being propelled by gravity.

The vehicle trip data 122 may include vehicle speed data, drive power data, and airflow data indicative of the airflow speed u and the airflow yaw angle y. The drive power data may be omitted from the vehicle trip data for the 'coasting' trip protocol wherein the vehicle is propelled by gravity and/or inertia. The vehicle speed data is comprised of a sequence of time-stamped values indicative of the vehicle's speed and its variation during the trip. In one embodiment, the vehicle speed data is in the form of a sequence of vehicle speed values $\{v_i\}$ measured at time instances $t_i$, i=1, . . . ,M, while the vehicle drive power data is in the form of a sequence of vehicle drive power values $\{P_i\}$ or the corresponding drive force values $\{F_i\}$ measured at substantially same time instances $t_i$ during the trip. In one embodiment, the vehicle speed data relates to instantaneous values of a rotation frequency of the vehicle's wheels, which can be used to compute the vehicle speed values $\{v_i\}$ using wheel size information. In one embodiment, the airflow data collected in step 120 includes sequence of air speed values $\{u_i\}$ and a sequence of airflow yaw angle values $\{\gamma_i\}$, i=1, . . . ,M. In another embodiment, the airflow data includes sequences of values generated by an airflow sensor that are indicative of both the air speed u and the airflow yaw angle γ, which are then computed in the following VE processing step 130. Such airflow sensor generate values may include un-processed sensor outputs such as two or more differential airpressure values, or airflow velocity components $u_x$, $u_y$, and $u_z$.

At step 130, the vehicle trip data 122 are used to compute virtual elevation $e_v$ or slope $\beta_v$ for the route 30, for example using equations (5b) or (6) and 7 or the like, and further using a trial rule relating the resistance coefficients CxA and, optionally, Crr to values of the airflow yaw angle. This mapping rule may be represented using functional notations CxA (yaw) and Crr(yaw), and is referred to hereinafter as the CxA(yaw) and Crr(yaw) functions. The processing in step 130 may include, for example, solving equation (5b) with respect to the slope angle β as a function of time t or distance x, and then optionally computing therefrom the virtual elevation $e_v$ 140 for the trip along the route 30 as a function of travel time or distance. For clarity of the description, hereinafter we will mainly concentrate on an embodiment wherein the rolling resistance Crr is assumed to be independent on yaw. One skilled in the art will appreciate that the dependence of Crr on yaw may be accounted for, and determined, within the confines of the present invention using a substantially same approach that is described herein for determining CxA(yaw).

Computing the virtual slope $\beta_v$ or virtual elevation $e_v$ may require the knowledge of the air density ρ, as indicated in equations 5(b) and (6). Known in the art methods for estimating the air density may be used. In one embodiment, the vehicle 10 is provided with a barometric pressure sensor for measuring the barometric, or static, pressure $P_s$, and a temperature sensor for measuring the temperature T during the travel, which enables to compute the air density $\rho = P_s/(RT)$ therefrom as known in the art, where R=0.286 KJ/kg/° K is the gas constant. In one embodiment, an externally supplied value for the air density value ρ may be used, for example as measured in a vicinity of the route 30 at the time of the travel.

In step 150, the computed virtual elevation or slope profile 140 is evaluated by verifying that it matches known trip features, such as known elevation features of the route 30 or the selected trip protocol. Known feature of the route may include a known elevation profile of the route or features of the trip elevation profile that follow from a selected trip protocol, for example a periodicity of a 'true' trip elevation profile for a trip that includes multiple loops. If the computed virtual elevation or slope profile 140 satisfies an evaluation criterion, the function CxA(yaw) used in computing the slope β is sent to an output in step 170. Otherwise, a new rule relating CxA to yaw, i.e. a new function CxA(yaw) is selected at step 160, and steps 130 and 150 are repeated until the latest generated profile of the virtual evaluation or slope satisfies the selected evaluation condition.

Figure 5:
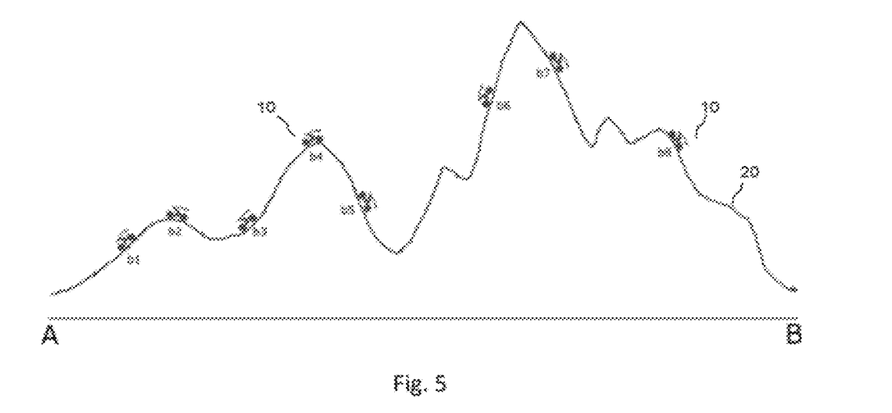
FIG. 5 is a graph showing an exemplary elevation profile of the route shown in FIG. 4.
Figure 6:
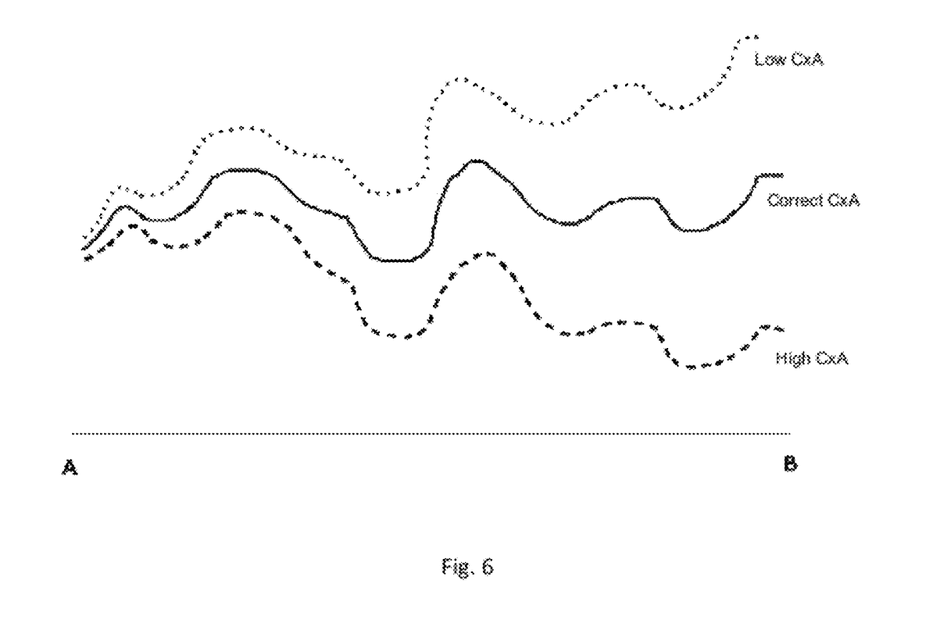
FIG. 6 is a graph showing three exemplary virtual elevation profiles of the route shown in FIG. 4 for three different trial values of the CxA.

Advantageously, the computed virtual elevation profile for the trip is generally quite sensitive to the values of CxA and Crr used in the computation, which enables obtaining accurate results for these parameters by matching the virtual elevation to real elevation data for the route. By way of example, FIG. 5 schematically illustrates an exemplary elevation profile 20 of the selected route 30. In the figure, multiple vehicle symbols and labels 'b1', . . . , 'b8' indicate elevation and slope angle β, respectively, at different times during the travel of the vehicle 10 along the route 30, while FIG. 6 illustrates three exemplary VE profiles obtained for three different trial values of a constant CxA parameter.

In one embodiment, the trial mapping rule used in step 130 relating the ADA to the yaw angle may be in the form of an adjustable function CxA(yaw, $p_0$, . . . ,$p_{k-1}$), wherein the dependence of CxA on yaw is defined by two or more adjustable parameters $p_0$, . . . ,$p_{k-1}$, where K is equal or greater than 2. In the following, the full set of these adjustable parameters used in a particular embodiment of the method will be denoted as {p}, i.e. so that {p}={$p_0$, . . . ,$p_{k-1}$}. By way of example, equations (8) and (9) illustrate two different forms of the adjustable CxA(yaw, {p}) function that can be used in step 130 for computing the virtual elevation:

$$CxA(yaw,\{p\})=p_1+p_2\cdot\cos(p_0\cdot\gamma)+p_3\cdot\sin(p_0\cdot\gamma)+p_4\cdot\cos(2\cdot p_0\cdot\gamma)+p_5\cdot\sin(2\cdot p_0\cdot\gamma)+\ldots, \quad (8)$$

$$CxA(yaw,\{p\})=p_0+p_1\cdot\gamma+p_2\cdot\gamma^2+p_3\cdot\gamma^3+p_4\cdot\gamma^4+\ldots \quad (9)$$

The virtual elevation profile $e_v(i)$, or the virtual slope profile $\beta_v(i)$ i=1, . . . ,M, obtained in step 130 depends upon the adjustable parameters {p}, and can be described using the notations $e_v(i,\{p\})$ or $\beta_v(i,\{p\})$, respectively, where i is an index designating a point during the trip and refers to a particular travel time or distance during the trip.

In one embodiment, step 150 includes computing an error function C=C{Crr, CxA( )} based on the virtual elevation or slope 140 obtained from step 130 and known trip features, for example known true elevation profile e(x) of the route 30. This error function quantifies a mismatch between the virtual elevation profile $e_v$ and the real elevation e of the route 30. The particular form of the error function may depend on available information about the route 30, in particular whether the true elevation profile of the route 30 is known, on the selected route protocol, and different implementations of the method may utilize different error functions within the scope of the present invention. In the following, several possible error functions are described by way of example.

In one embodiment, the trip data 122 is comprised of time stamped values measured at suitably small intervals while the vehicle moves along the route 30. These trip data includes a sequence of M time-stamped values u(i) of the airflow velocity and a sequence of time-stamped values of the yaw angle $\gamma_i$ measured at suitably short intervals while the vehicle 10 was moving along the route 30 from 'A' to 'B'. The time stamped values may be, for example, in the form of u and γ values accompanied by a time value at which a corresponding measurement was made. Accordingly, the index i=1, . . . , M may be viewed as a location index denoting a sequence of locations $x_i$ along the route 30. Step 130 may include the following operations: a) for each yaw angle $\gamma_i$ from the airflow data, computing a sequence of virtual slope values $\beta_v$, thereby generating the virtual slope profile $\beta_v(x_i)=\beta_v(x_i, Crr, CxA())$, b) optionally generating the virtual elevation profile in the form of a sequence of M virtual elevation values $e_v(x_i)=e_v(x_i, Crr, CxA())$, and c) outputting the virtual elevation or slope profile 140. If the elevation $e(x_i)$ at the locations $x_i$ along the route 30 is known, for example measured during the trip or obtained elsewhere, the error function C can be computed in accordance with the following equation (10):

$$C(C_{rr}, CxA[\ ]) = \sum_{i=1}^{M} ((e_v(x_i) - e(x_i))^2 \quad (10)$$

In one embodiment, the route 30 forms a loop of length D that is travelled by the vehicle 10 N times, while collecting the trip data 122. Here, N is an integer greater than 1. This trip data includes a sequence of M time-stamped values u(i) of the airflow velocity and a sequence of time-stamped values of the yaw angle $\gamma_i$ measured at suitably short intervals while the vehicle 10 was moving along the route 30. The index i=1, . . . ,M may be a time index corresponding to a distance $x_i$ that the vehicle 10 traveled along the route 30 during the trip up to the time instance $t_i$. Note that if the vehicle makes several loops along the route 30 while collecting the trip data, the distances $x_i$>D and ($x_i$−D) correspond to a same location $x_i'$ along the route 30, which can be found using a modulo operation, i.e. $x_i'=x_i$ (mod D). Step 130 generates the virtual elevation profile 140 in the form of a sequence of M virtual elevation values $e_v(i)=e_v(i, Crr, CxA())$. If the elevation e(i) at the locations $x_i'$ along the route 30 is known, the error function C can be computed in accordance with the following equation (11):

$$C(C_{rr}, CxA[\ ]) = \sum_{i=1}^{M} ((e_v(i) - e(x_i \mod D))^2 \quad (11)$$

In yet another embodiment, the vehicle 10 may travel the distance D from 'A' to 'B' along the route 30 as illustrated in FIG. 4a, and then turn back and travel the same root in the opposite direction, i.e. following the 'out-and-back' protocol while collecting the trip data 122. The trip data 122 includes a sequence of M time-stamped values u(i) of the airflow velocity and a sequence of time-stamped values of the yaw angle $\gamma_i$ measured at suitably short intervals while the vehicle 10 was moving along the route 30 from A to B and back. The index i=1, . . . , M may be a time index corresponding to a total distance $x_i$ that the vehicle 10 traveled along the route 30 up to the time instance $t_i$. Note that the distances $x_i$>D and (D −$x_i$) correspond to a same location along the route 30. Step 130 generates the virtual elevation profile 140 in the form of a sequence of M virtual elevation values $e_v(i)=e_v(i, Crr, CxA())$. If the elevation e(i) at the locations $x_i'$ along the route 30 is known, the error function C can be computed in accordance with the equation (11) hereinabove. If the elevation e(i) at the locations $x_i'$ along the route 30 is not known, the error function can be constructed based on the knowledge of the route symmetry—namely, that the distances $x_i$>D and (D−$x_i$)

correspond to a same location and thus correspond to a same route elevation value. In this case, the known feature of the route elevation is its symmetry, according to which the route elevation profile $e(x_i)$ satisfies the condition $$e(x_i > D) = e(D - x_i) \quad (12)$$

The error function can then be constructed based only on the virtual elevation values and the symmetry feature (12) of the route elevation, such as in accordance with the equation (13):

$$C(C_{rr}, CxA[\ ]) = \sum_{i=1}^{M} ((e_v(x_i) - e_v(D - x_i))^2 \quad (13)$$

In computing the error function in accordance with the equation (13), the VE values $e_v(D-x_i)$ may be estimated using interpolation.

Error functions described by equations (10), (11) and (13) represent substantially a mean squared error (MSE) of the virtual elevation profile with respect to the known route elevation features. Alternatively, error functions other than MSE based may be used, such as a generalized error function as known in the art. In some embodiments, the error function may be computed based on a subset of available data points. For example, the summation in the right hand side of equations (10), (11) and (13) may be performed only for selected trip points, for example using only one or two points per loop if the number of loops N in the trip is large enough. Generally, the step of computing the error function may include computing the difference between the virtual elevation and the real elevation for a plurality of locations along the route, or the difference between the virtual elevation values at different traveled distances when said different travel distances are known to correspond to a same geographical location in the route, and then generating a combined measure for the plurality of computed differences.

Once the error function for a selected yaw-to-ADA mapping rule, e.g. as defined by values of the adjustable parameters {p}, is generated, this error function is evaluated in step 150 using a pre-defined criterion, for example in relation to a pre-defined threshold value $C_{th}$. If it is determined that C satisfies a condition $$C < C_{th}, \quad (14)$$

the last model function CxA(yaw, {p}) used in step 130 is output in step 170 as a true drag area vs. yaw characteristic of the vehicle. Otherwise if condition (13) is not satisfied, a new set of adjustable parameters {p} and a new function CxA (yaw, {p}) corresponding thereto, are generated in step 160, for computing an updated VE profile in step 130.

It will be appreciated that the process described hereinabove may be implemented using the virtual slope $\beta_v$ of the route 30 instead of the virtual elevation $e_v$, and evaluating it based on known features of the route 30; any modification of the process, if required, will be evident to those skilled in the art. For example, in the case of the 'out and back' travel protocol, equation (13) for the error function C may be modified for the virtual slope $\beta_v$ as defined by the following equation (15):

$$C(C_{rr}, CxA(\ )) = \sum_{i=1}^{M} ((\beta_v(x_i) + \beta_v(D - x_i))^2 \quad (15)$$

Here notations are used wherein the sign of the slope angle $\beta$ depends on the direction of the vehicle's motion, so that for the true slope along the route, $\beta(x) = -\beta(D-x)$ for the out-and-back travel protocol.

Furthermore we note that the drag area CxA may depend upon both the yaw angle of the airflow and the magnitude u of the airflow velocity vector u. In one embodiment of the invention step 130 utilizes trial mapping rules, CxA(yaw, u, {p}), which relate the CxA values to both the yaw and the air speed in dependence upon parameters {p}. By way of example, the trial function CxA(yaw, u, {p}) may be in the following form:

$$CxA(yaw, u, \{p\}) = p_0 + p_1 \cdot \gamma + p_2 \cdot \gamma^2 + p_3 \cdot \gamma^3 + p_4 \cdot \gamma^4 + p_5 \cdot u + p_6 \cdot u \cdot \gamma + p_7 \cdot u \cdot \gamma^2 \ldots \quad (9)$$

It will be appreciated that other functional forms for the trial CxA(yaw, u, {p}) mappings may also be used within the scope of the present invention.

Referring again to FIG. 3, the operations described hereinabove with reference to steps 120 to 170 may be performed by a single vehicle-based sensor device or sensor system, or may be performed by a system that includes one or more vehicle-based sensors and a remote computer device, which can be in the form of a general purpose computer or a specialized apparatus that may include a wireless transceiver for receiving the trip data. The steps 110 and 120 that may be referred to as data collection steps, and include the use of a plurality of sensors located at the vehicle. Steps 130 to 170 that may be implemented using a suitable computing device such as a general purpose computer, a dedicated vehicle-based device including memory and a suitable hardware processor such as a microcontroller, or a hand-held or pocket computing device capable of executing computer code, including a smartphone, a PDA (personal digital assistant) or the like. In the context of the present specification, all such computing devices are referred to herein as computers.

Accordingly, one aspect of the invention provides a computer-implemented method for determining the dependence of the ADA of a vehicle on the yaw direction of the airflow relative to the vehicle. In one embodiment of this aspect of the invention, the method receives the trip data 122 as an input, and generates, for example using steps 130 and 150 described hereinabove with reference to FIG. 3, the CxA(yaw) and, optionally, the CxA(u) dependence. These dependencies may be generated in various forms, such as but not exclusively a look-up table and/or a set of parameters, such as {p}, that can be used to compute CxA for any given value of yaw and, optionally, other airflow characteristics such as u, within an allowable range of values.

Figure 7:
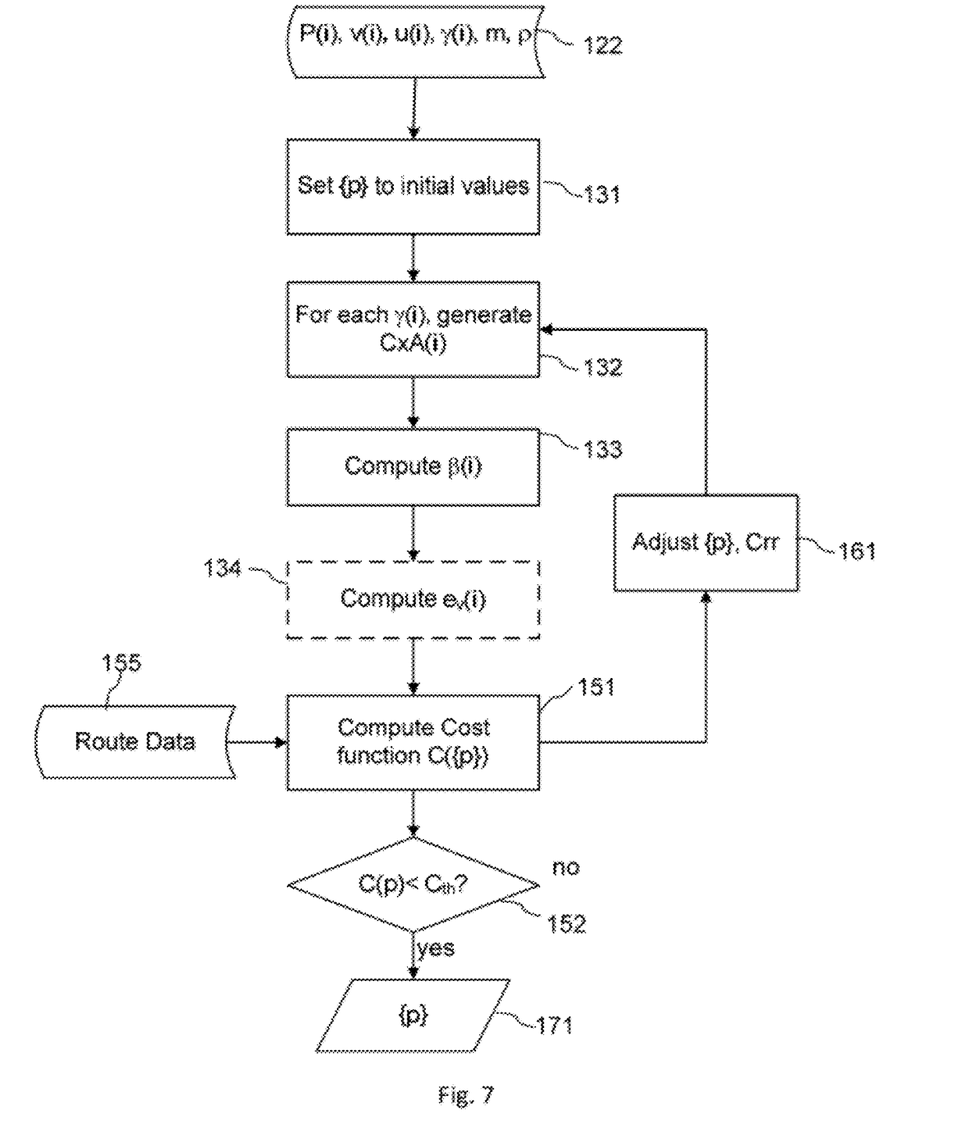
FIG. 7 is a flowchart of a computer-implementable method for determining the angular dependence of the aerodynamic drag area CxA from input vehicle trip data according to an embodiment of the method.

With reference to FIG. 7, one embodiment of the computer-implemented method according to the present invention includes generating, based on the trip data 122 as an input, the set of parameters {p} that define the dependence of ADA on yaw in accordance with a selected mapping rule CxA(yaw, {p}). The trip data 122 includes a sequence {v} of time-stamped values v(i) of the vehicle speed, a sequence {u} of time-stamped values u(i) of the airflow speed relative to the vehicle, a sequence {γ} of time-stamped values γ(i) of the airflow yaw angle, and optionally a sequence {P} of time-stamped values P(i) of the vehicle drive power, all obtained by collecting respective data during the vehicle's trip along the route 30 at suitably small time intervals, for example every few seconds or less. Here, the index i=1, . . . ,M, denotes time instances, or corresponding traveled distances, to which the respective data relate. In some embodiments, data collected by different sensors may be collected at different time instances and/or at different intervals. For example, a power-meter may provide drive power data P(i) at a fixed time interval, for example every 1.26 seconds, while the vehicle speed may be determined from a wheel rotation sensor that generates signals with a wheel rotation frequency, from which signals the vehicle speed values are determined based on the wheel size. In such cases, the method includes a sensor data pre-processing step wherein the trip data are synchronized to relate to substantially same time instances during the trip, which may include interpolation and selecting subsets of sensor data. In the following, the index i refers to successive values in such time-synchronized trip data sequences. The trip data 122 may also include the vehicle mass m and the air density ρ. In other embodiments, these data may be provided to the method separately from the trip data 122, such as by user input. In one embodiment, the trip data 122 includes a sequence {e} of time-stamped values e(i) of the 'true' elevation for the route 30, for example as determined using an on-board GPS receiver capable of accurate altitude measurements. In one embodiment, external data for the true elevation profile of the route 30 are used to generate the sequence {e} of the true elevation values.

In the illustrated embodiment, the method starts with receiving the input trip data 122. At step 131, the adjustable parameters $p_k$, which define a mapping rule CxA (yaw, {p}), are set to their initial values $p_{k,0}$, i.e. $p_k=p_{k,0}$, k=0, ...,K−1, where K is the number of adjustable parameters defining the mapping rule. By way of example, the initial values of the adjustable parameters may be selected to yield a yaw-independent CxA equal to an estimated CxA value for a particular vehicle type, which are available in the literature. In the case of a bicycle, an ADA value of approximately 0.350 m$^2$ can be used as the initial estimate of the CxA value at zero yaw. In one embodiment, this step also includes setting the value of the rolling resistance Crr to an initial value, Crr=Crr$_0$, for example using known in the art Crr estimates for a particular vehicle type.

At step 132, the set of adjustable parameters {p} and a selected mapping rule CxA(yaw,{p}) relating CxA to yaw are used to generate a plurality of different ADA values CxA(i)= CxA(γ(i), {p}) for the yaw values γ(i) comprised in the trip data 122.

At step 133, the generated ADA values CxA(i), the initial Crr value Crr$_0$ and the vehicle speed v(i) and power P(i) values for same time/distance indices i are used to compute a plurality of the virtual slope values β(i), for example by substituting CxA(i), Crr, v(i), and P(i) in place of Crr, CxA, v, and P in equation (5b) or (6). The vehicle acceleration a=dv/dt corresponding to the i$^{th}$ point in the trip may be computed based on the measured vehicle speed data v(i), or using direct accelerometer readings if provided with the trip data 122.

At step 134, a virtual elevation profile $e_v(i)$ for the trip may be computed by integrating the slope profile as described hereinabove. This step may be omitted in embodiments wherein the error function is based on the virtual slope rather that elevation, as discussed hereinabove.

At step 151, the error function C({p}) for the virtual elevation or slope profile is computed based on known features of the route 30, for example in accordance with equations (10), (11), (13) or (15). This step may be preceded by a user input step wherein the user inputs route data 155 such as the route travel protocol and the route length D. By way of example, the route/trip protocol may specify whether the route is a loop, and how many loops or out-and-back passes N along the route 30 the trip data 122 represents. The user input data 155 may also include the vehicle mass m and the air density ρ if not provided in the trip data 122. The particular form of the error function C({p}) may be selected in dependence upon the route trip protocol specified by the user.

At step 152, the computed value of the error function C({p}) is evaluated based on a selected criterion. For example, the error function C({p}) may be compared to the threshold value $C_{th}$ saved in memory, and if the error function C({p}) exceeds $C_{th}$, values of the adjustable parameters $p_k$ are changed, e.g. incremented or decremented, in step 161, and the processing returns to step 132 for computing a new set of yaw-dependent and, optionally, u-dependent ADA values CxA(i). The processing steps 161, 132,133, 151, 152, are iteratively repeated, at each iteration saving a current set {p} in memory for possible use in the next iteration, until the condition evaluated in step 152 is met, at which point the latest saved set of adjustable parameters {p} 171 is sent to the output for generating the ADA values in dependence upon yaw. In one embodiment, this iterative processing is implemented using a known minimization algorithm to find a minimum of the error function C({p}) in the space of the adjustable parameters {p} By way of example, the iterative processing may be implemented using the method of the steepest decent as known in the art. In one embodiment, the set of adjustable parameters that are adjusted in step 161 includes the rolling resistance coefficient Crr. In one embodiment, the set of adjustable parameters {p} includes parameters that define values of the rolling resistance coefficient Crr in dependence on yaw and, optionally, airflow speed u.

Figure 8:
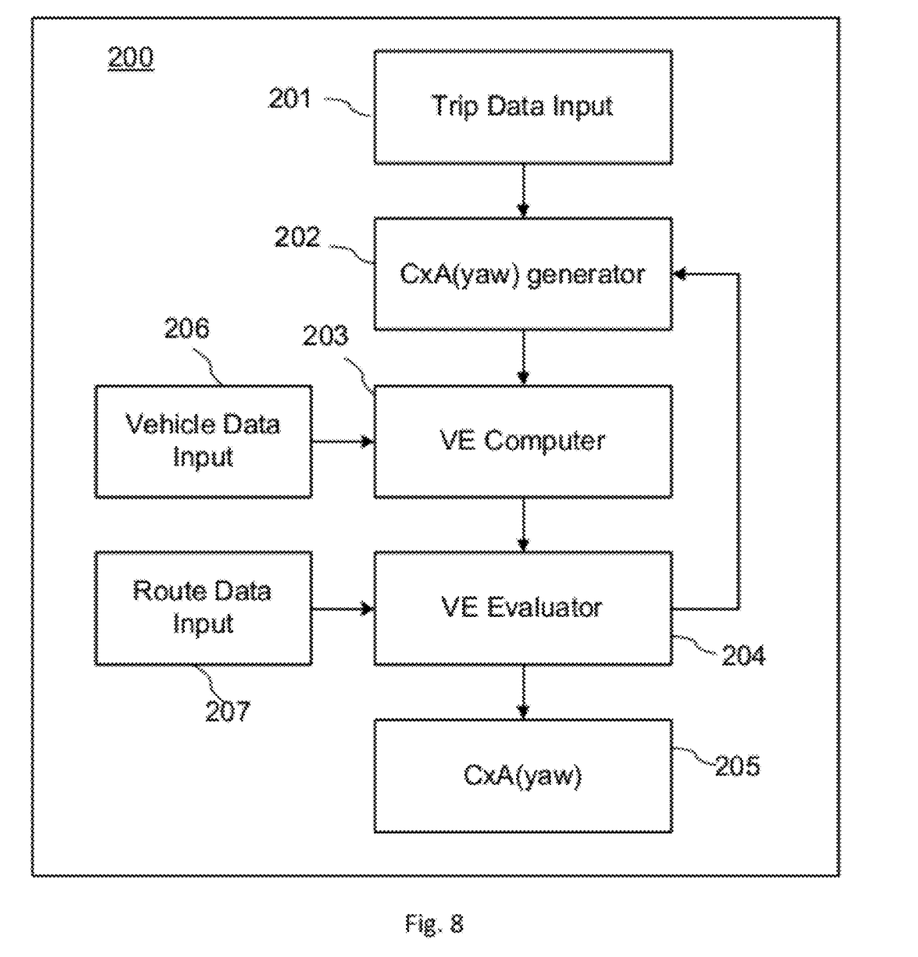
FIG. 8 is a schematic block diagram of a computer program product comprising instructions for implementing the method of FIG. 3 according to an embodiment of the present invention.

With reference to FIG. 8, one aspect of the present invention provides a computer program product that includes a computer-readable storage device 200 storing a set of computer executable instructions for performing the steps of the method of the present invention for determining the aerodynamic drag area of a moving vehicle in dependence upon the airflow yaw direction based on the input trip data 122. In one embodiment, this set of instructions includes first instructions 210 for inputting the trip data 122, which may include instructions for synchronizing the trip data in time as described hereinabove, second instructions 202 for generating trial mapping rules CxA(yaw), which may include instructions for assigning values to the set of adjustable parameters {p} and computing CxA(γ(i)) values as described hereinabove with reference to steps 131, 132 and 161, third instructions 203 for computing the virtual slope or elevation based on the generated mapping rule CxA(yaw) as described hereinabove with reference to FIG. 3 and equations (5b) and (6), forth instructions for evaluating the virtual slope or elevation profile, for example as described hereinabove with reference to steps 150 and 151, and fifth instructions 205 for outputting the CxA (yaw) rule that passed the evaluation. The storage device 200 may further include sixth instructions 206 for inputting, for example by the user, vehicle-related data such as the vehicle mass and/or type, and seventh instructions 207 for inputting the route trip data.

Figure 9:
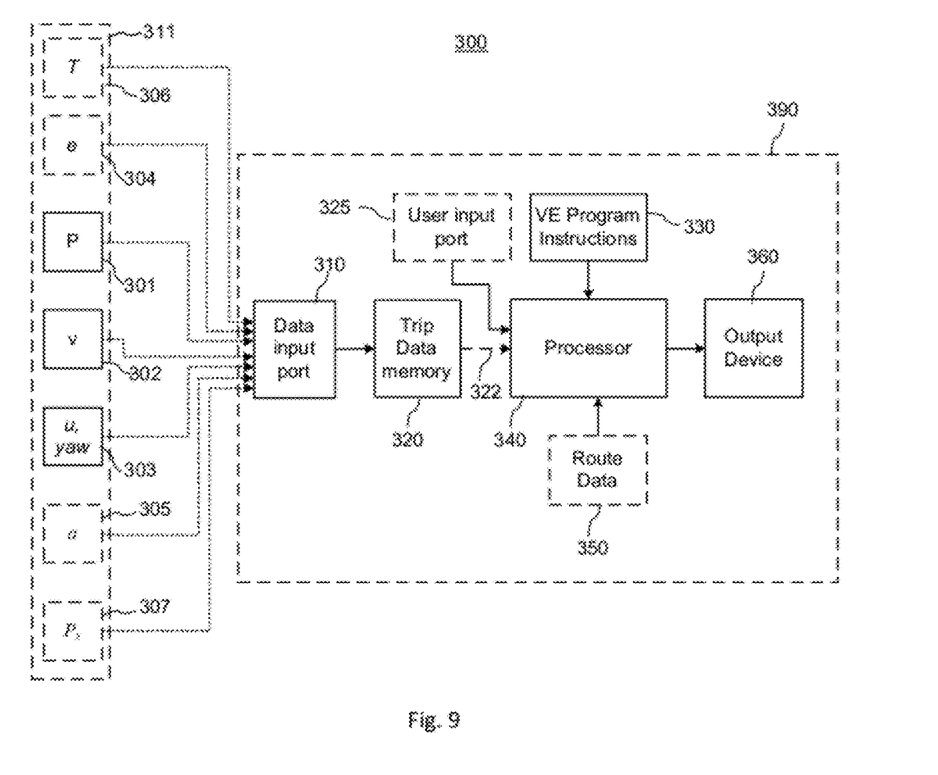
FIG. 9 is a schematic block diagram of a system for implementing the method of FIG. 3 according to an embodiment of the present invention.

With reference to FIG. 9, there is illustrated an exemplary system 300 implementing the method of the present invention for determining the dependence of the ADA on the airflow yaw direction and/or velocity. The system 300 includes a set of sensors 311 for collecting trip data, a first data input port 310 for receiving the vehicle trip data 122 from the sensors, and a trip data memory 320 coupled to the data input port 320 for saving the trip data. The trip data memory 320 provides the trip data to a processor 340 through a data link 322. A VE program memory 330 is further provided for storing the computer executable instructions, as described hereinabove with reference to FIGS. 3, 7 and 8, for determining the dependence of the 'axial' drag area CxA on the airflow yaw direction and, optionally, the airflow velocity u. An optional route data memory 350 may be provided that stores route data such as the elevation profile e(x) and length D of the route 30. In one embodiment, the elevation profile e(x) and length D of the route 30 are provided within the trip data 122 obtained via the data input port 310. The memory units 320, 300 and 350 may be embodied as different memory areas within a single memory device such as a hard drive, CD, solid state flash drive or alike as known in the art, or using two or more separate memory devices. An optional user input port or device 325 that connects to the processor 340 may be provided to enable user input. In one embodiment, the user input may include the vehicle mass m. In one embodiment, the user input may include selecting the trip protocol, such as 'cruising', 'loops', 'out-and-back', or 'one-way', number of loops or returns N, route length D. The user input device/port 325 may be embodied using a keyboard, a mouse, or any suitable user input device arrangement that may include a display. An output device 360 is coupled to the processor 340 for outputting the CxA(yaw) or Cx(u) dependence as determined by the processor 340 after executing the instructions stored in the VE program memory 330 based on the trip data 122 received from the data input port 310 and optionally stored in memory 320. The output device 360 may include one or more of the following: a computer display, a memory device such as a hard drive, a flash drive and alike, and a wireless transmitter. Not all of the sensors 301-307 may be provided. When provided, the sensors are located at the moving vehicle, and may include memory for storing data collected during the trip, and may be equipped with wireless transmitters. In such embodiments, the input data port 310 is in the form of, or includes, a wireless receiver for receiving the trip data collected by the sensors. In one embodiment, the wireless receiver and transmitters comply with the ANT+™ format.

Not all of the sensors 301-307 may be provided in each embodiment. Preferably, the set of sensors 311 provided at the vehicle includes at least a drive power sensor 301, a vehicle speed sensor 302, and an airflow sensor 303. Sensors for collecting the drive power data and the vehicle speed data are well known in the art, see for example, U.S. Patent '180 the disclosure of which is incorporated herein by reference, and will not be described here in detail. Another example of a suitable power sensor 301 for bicycles are CinQo Saturn powermeters that are available from Quarq Technology, Spearfish, S. Dak., USA. U.S. Pat. No. 7,490,510, which is incorporated herein by reference, describes an airflow data probe that is capable of providing airflow speed and direction data. With some modifications, the air data probe disclosed therein can be used in embodiments of the present invention to provide the airflow speed and yaw direction data. Multi-hole probes incorporating pressure sensitive equipment, such as those available from Aeroprobe Corp., Blacksburg, Va., USA can be used as the airflow sensor 303 for collecting the airspeed and airflow direction data with an accuracy of 0.8% of calibrated magnitude and 0.4° angle.

In one embodiment, the set of sensors provided at the vehicle includes a barometric pressure sensor 307 and a temperature sensor 306, which provide information enabling to compute the air density p. In one embodiment, the airflow sensor 303 measures a static pressure $P_s$, which may be used as the barometric pressure as known in the art, eliminating the need for the sensor 307. Other optional sensors include an altitude or elevation sensor 304 and an accelerometer 305. In one embodiment, the vehicle is equipped with a GPS receiver that may combine the functionalities of the sensors 302 and 304, providing time-stamped data for the vehicle velocity v and the elevation/altitude e during the trip.

In one embodiment, the blocks 310, 320, 330, 340, 350, 325 and 360 are embodied within a single computing device 390, for example using an ANT+™ transceiver, a microcontroller and an LCD display. The device 390 may be mountable on the vehicle 10, or may be positioned during the trip remotely from the vehicle within the range of the wireless data transmission from the sensors. In one embodiment, the data input port 310 and the trip memory 320 may be separate from the processor 340 within a separate device. In one embodiment, the processor 340 is a CPU of a general purpose computer, and the data link 322 between the trip memory 320 and the processor 340 may be absent during the trip, and may be in the form of a temporary connection, such as using USB ports, that is established after the trip is finished.

Figure 10:
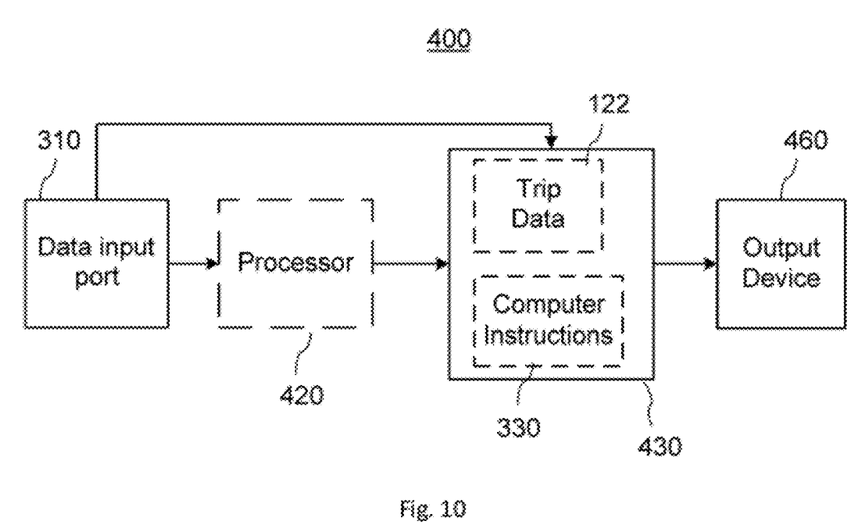
FIG. 10 is a schematic block diagram of a data logger device according to an embodiment of the present invention.

With reference to FIG. 10, one embodiment of the invention provides a data logger device 400, which can be used to log vehicle trip data during a trip and for determining the CxA(yaw) dependence and/or CxA(u) dependence based on these data using an external computing device, such as, but not exclusively, a general purpose computer. The data logger 400 incorporates the data input port 310 such as a wireless receiver, an optional processor 420 such as a suitable low-power-consumption microcontroller, for example as described in '180 patent, a memory device 430 such as a solid-state flash drive, and an output device 460 such as a USB port or other suitable computer port. The data logger 400 may be placed in the vehicle 10, or attached thereto, for collecting data from the sensor set 311 during the trip along the route 30. The data received from the sensors may optionally be pre-processed by the optional processor 420, for example to convert the sensor-generated data to a suitable format, and then saved in the memory device 320 as the trip data 122. The conversion may include, for example, converting airflow data obtained from the airflow sensor 303 into yaw and air speed u. In one embodiment, the airflow data from the sensor 303 maybe in the form of a sequence of time-stamped values of airflow velocity components such as $u_x$, $u_y$, and, optionally, $u_z$, which may be converted by the processor 420 into the yaw and u values.

In one embodiment, the memory device 430 further stores a first set of computer executable instructions 330 for implementing the method for determining the yaw angle dependence of the ADA according to an embodiment of the present invention, such as described hereinabove with reference to FIGS. 3, 7 and 8. The memory device 430 may further store a second set of computer-executable instructions directing the computer to execute the first set of executable instructions 330 when the computer port 460 is coupled to a compatible port of the external computer device.

The present invention has been described hereinabove with reference to particular embodiments that are given herein by way of example only and are not meant to limit the invention. The invention herein described with references to these embodiments enables to determine the dependence of the aerodynamic drag area of a vehicle upon the airflow yaw direction and speed. Knowledge of this dependence is of great practical importance. For example, it may be used in vehicle design to optimize its shape or materials. Knowing this dependence may also be advantageous for high-performance bicycle riders, enabling them to optimize the rider position, closing, and to select bicycle design. However, heretofore obtaining information regarding the ADA(yaw) dependence would conventionally require using a wind tunnel, which is expensive and may not be available everywhere. Advantageously, the present invention effectively provides a 'virtual wind tunnel', wherein the dependence of the ADA of the vehicle upon the airflow yaw direction is obtained simply by processing trip data collected from the vehicle while it travels along, substantially, any route, following a simple travel protocol.

One skilled in the art will recognize from the above that the present invention can be extended to any number of different combinations or subsets of sensing, computing, and storage elements. Accordingly, the present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

We claim:

1. A method for determining an aerodynamic drag area (ADA) for a vehicle in dependence upon an airflow direction, comprising:
    a) obtaining vehicle trip data comprising vehicle speed data and airflow data, the vehicle trip data collected for the vehicle during a trip thereof along a selected route, wherein the airflow data comprises airflow yaw angle data and airflow speed data, or information indicative thereof;
    b) from the vehicle trip data, computing a plurality of virtual elevation or slope profiles for the trip using a plurality of rules relating the ADA to the airflow yaw angle;
    c) selecting, from the plurality of rules relating the ADA to the airflow yaw angle, a selected rule that corresponds to a virtual elevation or slope profile that matches a known feature of the trip; and,
    d) using the selected rule for computing the ADA of the vehicle in dependence upon the airflow yaw angle.

2. The method of claim 1, further comprising displaying one of: a computed virtual elevation or slope profile, or the computed ADA in dependence on the airflow yaw angle on a computer display.

3. The method of claim 1, wherein computing each of the plurality of virtual elevation or slope profiles in step b) comprises generating a plurality of different values for the ADA based on airflow yaw angles comprised in the airflow data.

4. The method of claim 1, wherein computing each of the plurality of virtual elevation or slope profiles in step b) comprises generating a plurality of different values for the ADA in dependence upon airflow speed values comprised in the airflow data.

5. The method of claim 3, wherein the plurality of rules relating the ADA to the airflow yaw angle are defined by a set of K adjustable parameters, wherein K≥2, and wherein steps b) and c) comprise:
    e) assigning values to the adjustable parameters;
    f) using the adjustable parameters and the airflow yaw angles comprised in the airflow data to generate a plurality of ADA values for the trip;
    g) computing a virtual elevation or slope profile for the trip using the plurality of ADA values generated in step f);
    h) computing an elevation error based on the computed virtual elevation or slope profile and a known feature of the trip; and,
    i) repeating steps f) to h) while adjusting values of the adjustable parameters so as to reduce the elevation error.

6. The method of claim 5, wherein step h) comprises computing a difference between a virtual elevation or slope value and a known true elevation value for a plurality of locations along the route.

7. The method of claim 5, wherein the trip includes multiple travels along the route, and wherein step h) comprises computing a difference between two virtual elevation or slope values corresponding to a same location that is passed by the vehicle at two different times during the trip.

8. The method of claim 5, wherein the plurality of rules relating the ADA to the airflow yaw angle also relate the ADA to airflow speed values so that different airflow speed values correspond to different ADA values as defined by the set of K adjustable parameters and wherein steps f) includes using the adjustable parameters and the airflow speed values comprised in the airflow data to generate the plurality of ADA values for the trip.

9. The method of claim 1, further comprising collecting the vehicle trip data from one or more sensor devices disposed at the vehicle during the trip.

10. The method of claim 1, further comprising storing the vehicle trip data in a computer readable memory.

11. A non-transitory computer-readable medium storing instructions, which when executed by one or more processors cause the processor to perform the operations comprising: determining an aerodynamic drag area (ADA) of a moving vehicle in dependence on airflow yaw direction, the computer program product comprising a computer-readable storage medium containing a first set of computer executable instructions, which, when executed by a processor, cause the processor to perform the steps of: a) obtaining vehicle trip data comprising drive power data, vehicle speed data, and airflow data, the vehicle trip data collected at the vehicle during a trip thereof along a selected route, wherein the airflow data comprises time-stamped sequences of airflow speed values and airflow yaw values relative to the moving vehicle; b) using the vehicle trip data and a plurality of rules relating the ADA to the airflow yaw angle to compute a plurality of virtual elevation or slope profiles for the trip; c) selecting, from the plurality of rules relating the ADA to the airflow yaw angle, a selected rule that corresponds to a virtual elevation or slope profile that matches a known trip feature; and, d) saving the selected rule in computer-readable memory.

12. A non-transitory computer-readable medium of claim 11, wherein the instructions further comprise instructions executable to use the selected rule for computing the ADA in dependence upon the airflow yaw angle, and for displaying thereof on a display device.

13. A non-transitory computer-readable medium of claim 11, wherein the instructions further comprise instructions executable to generate the plurality of rules relating the ADA to the yaw angle.

14. A non-transitory computer-readable medium of claim 11, further comprising an input port for receiving the trip data.

15. A non-transitory computer-readable medium of claim 14, wherein the input port comprises a wireless receiver for receiving the vehicle trip data.

16. A non-transitory computer-readable medium of claim 11, further comprising an output port for coupling to an external computer device comprising the processor for executing the set of instructions, wherein the computer-readable storage device further contains instructions for executing the first set of executable instructions when the output port is coupled to a compatible port of the external computer device.

17. An apparatus for determining an aerodynamic drag area (ADA) for a vehicle, comprising:
    an input port for receiving vehicle trip data comprising drive power data, vehicle speed data, and airflow data, the vehicle trip data collected for the vehicle during a trip thereof along a selected route, wherein the airflow data comprises airflow yaw angle data and airflow speed data, or information indicative thereof;

a data storage for storing the vehicle trip data comprising airflow speed data and the airflow yaw angle data;

a program storage containing computer executable instructions for generating a plurality of rules relating the ADA to the airflow yaw angle, using set plurality of rules to generate a plurality of virtual elevation or slope profiles for the trip, evaluating said plurality of virtual elevation or slope profiles based on known route or trip information to select one of the rules, and to store the selected route in memory for use in computing the ADA for the vehicle in dependence upon the airflow yaw angle; and, a processor coupled to the data storage and the program storage for executing the computer code.

18. The apparatus of claim 17, further comprising a display coupled to the processor for displaying computed values of the ADA in dependence upon the airflow yaw angle.

19. The apparatus of claim 17 wherein the input port comprises a wireless transmitter.

20. The method of claim 1, wherein the vehicle trip data comprises propulsion power data indicative of a propulsion power or a propulsion force exerted upon the vehicle during the trip.

* * * * *